UNITED STATES PATENT OFFICE.

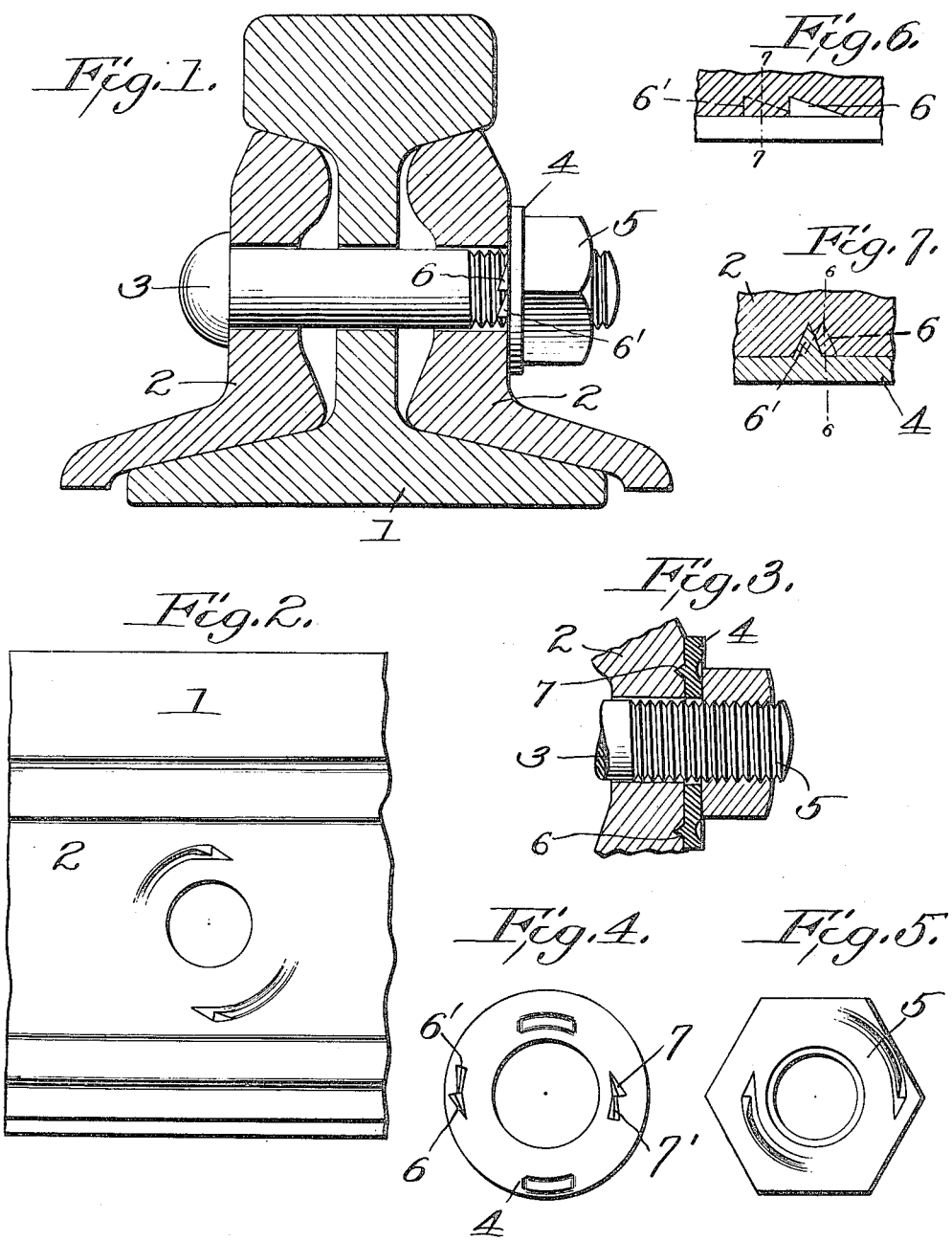

THOMAS E. STOCKFORD, OF WILLIAMS, CALIFORNIA, ASSIGNOR OF ONE-FOURTH TO CHARLES W. BLEVINS AND ONE-FOURTH TO HENRY H. RETTER, OF WILLIAMS, CALIFORNIA, AND ONE-FOURTH TO CHARLES E. STOCKFORD, OF SAN LEANDRO, CALIFORNIA.

NUT-LOCK.

1,031,970.  Specification of Letters Patent.  Patented July 9, 1912.

Application filed July 31, 1911. Serial No. 641,448.

*To all whom it may concern:*

Be it known that I, THOMAS E. STOCKFORD, a citizen of the United States, residing at Williams, county of Colusa, State of California, have invented certain new and useful Improvements in Nut-Locks, of which the following is a specification, reference being had therein to the accompanying drawing.

This invention relates to certain new and useful improvements in nut locks, the main object being to provide a single-piece nut lock which is especially adapted to be used in connection with railroad joints whereby an exceedingly simple and cheaply constructed nut lock is formed which will be automatic in operation in order to form a positive lock for the nut after the same has been tightened.

Another object of the invention is to provide a nut lock in the form of a washer having cutting projections formed on its opposite faces adapted to form grooves in the inner face of the nut and the outer face of the fish plate, said projections being so arranged that substantially concentric grooves will be formed in the respective members, one projection forming a groove into which the adjacent projection is adapted to throw a furrow so as to partly fill the groove and prevent the reversing of the nut and washer.

A further object of the invention is to provide a nut lock in which the pairs of cutting members are arranged in different radial positions upon the faces of the washer in order to prevent the annular grooving of the nut and fish plate whereby the same can be removed and the position of the washer changed so as to engage a new surface.

Other and further objects and advantages of the invention will be hereinafter set forth and the novel features thereof defined by the appended claims.

In the drawing—Figure 1 is a transverse section through a rail joint showing the application of my improved nut lock; Fig. 2 is a face view of the fish plate showing the groove formed therein by the cutting projections; Fig. 3 is a detail section through the fish plate, lock washer and nut; Fig. 4 is a plan view of the lock washer; Fig. 5 is an inner face view of the nut showing the groove formed therein; Fig. 6 is a detail section taken on line 6—6 of Fig. 7; and Fig. 7 is a section taken on line 7—7 of Fig. 6.

Like numerals of reference refer to like parts in the several figures of the drawing.

In the drawing, 1 indicates a rail, 2 the fish plates, 3 the connecting bolt, 4 the lock washer, and 5 the nut adapted to be locked by said washer, the above description being given so that the operation of my improved nut lock can be readily understood, it, of course, being understood that the same will operate in the same manner when applied to any other member to be fastened by a bolt.

The washer 4 is preferably formed of pressed steel and upon its opposite faces is provided with oppositely disposed projections 6—6' and 7—7', which are preferably formed by punching the same outwardly as shown, said projections being substantially V-shaped and having two inclined walls terminating in a cutting edge, the rear end of each projection being provided with a vertical wall. The cutting edges of each pair of projections are arranged to travel in different radial paths. The projections 6—6' are arranged at a greater distance from the center than the projections 7—7' in order to cause the same to travel in different radial paths which will prevent the members from being completely annularly grooved until a complete revolution is made.

The washer is placed on the bolt against the fish plate as clearly shown in Fig. 1, and as shown, the projections point in a reverse direction to those on the outer face and the nut is then placed on the bolt and screwed up tight which causes the washer to be rotated a slight distance the projections 6 and 7 forming grooves in the faces of the fish plate and nut, respectively. The projections 6' and 7' which are arranged to the rear of the projections 6 and 7 and closer to the center of the washer form grooves in the walls of the previously formed grooves, the furrow passing into the groove so as to partly fill the same and as the groove is formed in the wall the shape is changed and the wall distorted to such an extent that when the nut is reversed, the vertical walls at the rear of the projections 6 and 7 abut against the metal forced into the same and prevent the nut from becoming loosened.

I am aware that it is old to provide a nut with projections to engage a soft washer in order to partly fill a groove formed therein but it has been found that this manner of forming a nut lock is not practicable and the expense of manufacturing such a nut is so great that it has been impracticable to use the same. It will be seen that by my construction, I do not rely entirely upon the partial filling of the groove by the furrow but upon distorting the groove in connection with the furrow in order to prevent the reversing of the nut and I have found by experiment that an ordinary nut and fish plate in use upon railroads is formed of such metal that when my improved lock washer is applied thereto which is preferably formed of steel, the faces of the members will be distorted by the projections in such a manner that after the nut has been screwed up tight, it will be impossible for the same to work loose but by applying a wrench, the same may be unscrewed. This allows for the removal of the nut when desired and by changing the position of the lock washer in respect to the fish plate and nut, the same can be used several times in this manner before the face has been distorted to such an extent that the lock washer will fail to lock the nut.

Having described my invention and set forth its merits what I claim and desire to secure by Letters Patent is—

1. A nut lock comprising a washer having cutting projections arranged in pairs adapted to travel in different radial paths.

2. A lock washer having cutting projections arranged in pairs adapted to travel in different radial paths one in advance of the other, said cutting projections terminating in vertical walls, one projection of each pair being adapted to distort the groove formed by the other projection.

3. A nut lock comprising a washer having pointed cutting projections arranged in pairs upon its opposite faces, the projections on each side being arranged to travel in different radial paths, the projections on one side being arranged reverse to the projections on the other side.

4. A locking washer having pointed cutting projections provided with vertical rear walls arranged in pairs, one in advance of the other, the cutting edges of said projections being arranged to travel in different radial paths, the forward projection of each pair being adapted to form a groove in the member to be secured, the rear projection of each pair being adapted to distort and partly fill said groove.

5. The combination with a member to be secured and a bolt, of a washer arranged on said bolt, cutting projections formed on the opposite sides of said washer, said cutting projections being arranged in pairs, one projection of each pair being arranged in advance of its companion projection, and a nut working on said bolt adapted to force said projections into said member and nut.

6. The combination with an apertured member having a bolt arranged therein, a washer arranged on said bolt having pointed projections provided with cutting edges arranged in pairs, one in advance of the other, with the cutting edges arranged to travel in different radial paths, a nut working on said bolt adapted to be secured by said projections.

7. The combination with an apertured member having a bolt arranged therein, of a nut arranged on said bolt, a washer arranged on said bolt between said nut and member, said washer being provided with cutting projections arranged in pairs one in advance of the other and adapted to travel in different radial paths, said projections being adapted to cut concentric grooves within the member and nut, the rear projection being adapted to throw a furrow into the groove cut by the forward projection.

In testimony whereof I affix my signature in presence of two witnesses.

THOMAS E. STOCKFORD.

Witnesses:
W. F. WALLACE,
W. R. TURNER.